(12) United States Patent
Natori et al.

(10) Patent No.: US 12,283,845 B2
(45) Date of Patent: Apr. 22, 2025

(54) NON-ORIENTED ELECTRICAL STEEL SHEET, SEGMENTED STATOR, AND ROTATING ELECTRICAL MACHINE

(71) Applicant: NIPPON STEEL CORPORATION, Tokyo (JP)

(72) Inventors: Yoshiaki Natori, Tokyo (JP); Hiroyoshi Yashiki, Tokyo (JP); Miho Tomita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 898 days.

(21) Appl. No.: 17/311,821

(22) PCT Filed: Jan. 17, 2020

(86) PCT No.: PCT/JP2020/001536
§ 371 (c)(1),
(2) Date: Jun. 8, 2021

(87) PCT Pub. No.: WO2020/149405
PCT Pub. Date: Jul. 23, 2020

(65) Prior Publication Data
US 2022/0021248 A1 Jan. 20, 2022

(30) Foreign Application Priority Data
Jan. 17, 2019 (JP) .................. 2019-006447

(51) Int. Cl.
*H02K 1/02* (2006.01)
*C22C 38/00* (2006.01)
(Continued)

(52) U.S. Cl.
CPC ............. *H02K 1/02* (2013.01); *C22C 38/002* (2013.01); *C22C 38/005* (2013.01);
(Continued)

(58) Field of Classification Search
CPC .. H02K 1/02; H02K 1/12; H02K 1/22; H02K 5/04; H02K 2213/03; H02K 1/148;
(Continued)

(56) References Cited

U.S. PATENT DOCUMENTS

2006/0185767 A1 8/2006 Arita et al.
2017/0098498 A1 4/2017 Tada et al.
(Continued)

FOREIGN PATENT DOCUMENTS

CN 106574334 A 4/2017
JP 2000323318 A * 11/2000
(Continued)

*Primary Examiner* — Anthony M Liang
*Assistant Examiner* — Danny N Kang
(74) *Attorney, Agent, or Firm* — Birch, Stewart, Kolasch & Birch, LLP (57) ABSTRACT

A non-oriented electrical steel sheet has a chemical composition containing, in terms of % by mass, C: 0.0015% or less and Si: 2.5 to 4.0% and having an average crystal grain size of 10 to 40 μm, and an internal oxidation layer having a thickness of 0.5 to 3.0 μm present in a sheet thickness direction of a surface thereof.

8 Claims, 1 Drawing Sheet

(51) Int. Cl.
    *C22C 38/02*     (2006.01)
    *C22C 38/04*     (2006.01)
    *C22C 38/06*     (2006.01)
    *C22C 38/20*     (2006.01)
    *C22C 38/28*     (2006.01)
    *C22C 38/34*     (2006.01)
    *C22C 38/42*     (2006.01)
    *C22C 38/50*     (2006.01)
    *C22C 38/58*     (2006.01)
    *H02K 1/12*     (2006.01)
    *H02K 1/22*     (2006.01)
    *H02K 5/04*     (2006.01)

(52) U.S. Cl.
    CPC ............ *C22C 38/008* (2013.01); *C22C 38/02* (2013.01); *C22C 38/04* (2013.01); *C22C 38/06* (2013.01); *C22C 38/20* (2013.01); *C22C 38/28* (2013.01); *C22C 38/34* (2013.01); *C22C 38/42* (2013.01); *C22C 38/50* (2013.01); *C22C 38/58* (2013.01); *H02K 1/12* (2013.01); *H02K 1/22* (2013.01); *H02K 5/04* (2013.01); *C22C 2202/02* (2013.01)

(58) Field of Classification Search
    CPC ...... H02K 1/18; C22C 38/002; C22C 38/005; C22C 38/008; C22C 38/02; C22C 38/04; C22C 38/06; C22C 38/20; C22C 38/28; C22C 38/34; C22C 38/42; C22C 38/50; C22C 38/58; C22C 2202/02; C22C 38/004; C22C 38/14; Y02T 10/64; C21D 6/008; C21D 8/005; C21D 8/1233; C21D 8/1238; C21D 8/1261; C21D 8/1272; C21D 9/46

See application file for complete search history.

(56) References Cited

U.S. PATENT DOCUMENTS

2017/0260600 A1*   9/2017   Okubo ................. C22C 38/005
2020/0332387 A1*  10/2020   Kim ....................... C21D 6/008

FOREIGN PATENT DOCUMENTS

| | | |
|---|---|---|
| JP | 2001-172752 A | 6/2001 |
| JP | 2001-316778 A | 11/2001 |
| JP | 2006-265720 A | 10/2006 |
| JP | 2008-50686 A | 3/2008 |
| JP | 2009-249698 A | 10/2009 |
| JP | 2010-193659 A | 9/2010 |
| JP | 2015-214758 A | 12/2015 |
| JP | 2018-141206 A | 9/2018 |
| JP | 2018-154853 A | 10/2018 |
| KR | 10-2017-0002536 A | 1/2017 |

* cited by examiner

NON-ORIENTED ELECTRICAL STEEL SHEET, SEGMENTED STATOR, AND ROTATING ELECTRICAL MACHINE

TECHNICAL FIELD OF THE INVENTION

The present invention relates to a non-oriented electrical steel sheet, a segmented stator, and a rotating electrical machine including the segmented stator.

Priority is claimed on Japanese Patent Application No. 2019-006447, filed Jan. 17, 2019, the content of which is incorporated herein by reference.

BACKGROUND ART

Regarding rotating electrical machines such as electric motors and electric generators, constitutions in which a stator and a rotor provided on an inner circumference side of the stator are included are known. As materials for the stator and the rotor, non-oriented electrical steel sheets are often utilized. When a stator is produced integrally, a decrease in yield occurs as a problem. Thus, segmented stators in which a plurality of stator pieces are combined to be arranged side by side in a circumferential direction are often used (for example, refer to Patent Document 1).

Also, in recent years, global environmental problems have been attracting attention and demand for energy conservation effects is increasing. Particularly, there is a strong demand for higher efficiency of electrical devices and this tendency is significant in drive motors for electric vehicles and hybrid vehicles and compressor motors for air conditioners.

In order to improve the efficiency of electrical devices, it is effective to improve the magnetic characteristics of non-oriented electrical steel sheets utilized in motors included in electrical devices. For this reason, in response to such problems, for example, Patent Document 2 discloses a non-oriented electrical steel sheet having dramatically improved magnetic characteristics in a rolling direction.

According to Patent Document 2, it is possible to dramatically improve the magnetic characteristics in a rolling direction by performing skin pass rolling at a prescribed rolling reduction ratio and strain relief annealing after finish annealing. However, as a result of research by the inventors of the present invention, it, has been found that, even if the technique described in Patent Document 2 is adopted in a steel sheet containing 2.5% or more of Si, the magnetic characteristics thereof in a rolling direction cannot be improved in some cases.

Also, segmented stators are produced by processing non-oriented electrical steel sheets through punching processing, cutting, or the like. For this reason, non-oriented electrical steel sheets utilized for segmented stators are required to have workability, machinability, and the like. However, when the magnetic characteristics of the non-oriented electrical steel sheet in the rolling direction are improved as in Patent Document 2, anisotropy is likely to be present in a structure, which reduces workability in some cases.

In addition, when a segmented stator such above is utilized, it is necessary to fix a plurality of stator pieces from an outer circumference side through shrink fitting or the like in a ring-shaped case. For this reason, a compressive stress in the circumferential direction is applied between the stator pieces which are segmented and adjacent to each other. Such a compressive stress in the circumferential direction causes deformation of the segmented stator. Thus, there is a concern concerning a decrease in dimensional accuracy. However, Patent Document 2 does not consider such a problem.

PRIOR ART DOCUMENT

Patent Document

[Patent Document 1] Japanese Unexamined Patent Application, First Publication No. 2010-193659
[Patent Document 2] Japanese Unexamined Patent Application, First Publication No. 2006-265720

SUMMARY OF INVENTION

Problems to be Solved by the Invention

The present invention was made to solve such problems, and an object of the present invention is to provide a non-oriented electrical steel sheet which is appropriate for a segmented stator and has excellent workability and magnetic characteristics after strain relief annealing, a segmented stator which has excellent magnetic characteristics, in which deformation caused by a compressive stress in a circumferential direction is minimized, and which has high dimensional accuracy, and a rotating electrical machine which includes the segmented stator.

Means for Solving the Problem

The gist of the present invention includes the following non-oriented electrical steel sheet, segmented stator, and rotating electrical machine.

(1) A non-oriented electrical steel sheet according to an aspect of the present invention includes: a chemical composition containing, in terms of % by mass, C: 0.0015% or less; and Si: 2.5 to 4.0%, and in which an average crystal grain size is 10 to 40 µm, and an internal oxidation layer having a thickness of 0.5 to 3.0 µm present in a sheet thickness direction of a surface thereof.

(2) In the non-oriented electrical steel sheet according to (1), the chemical composition may contain, in terms of % by mass, C: 0.0015% or less; Si: 2.5 to 4.0%; Mn: 0.05 to 2.0%; sol. Al: 0.0005 to 1.50%; P: 0.080% or less; S: 0.0030% or less; Ti: 0.0030% or less; Ni: 0 to 0.10%; Cu: 0 to 0.10%; Cr: 0 to 0.10%; Sn: 0 to 0.20%; Ca: 0 to 0.0050%; Mg: 0 to 0.0050%; REM: 0 to 0.0050%; and the balance: Fe and impurities.

(3) In the non-oriented electrical steel sheet according to (1) or (2), $E_L/E_c$ which is a ratio between a Young's modulus $E_L$ in a rolling direction and a Young's modulus $E_c$ in a direction perpendicular to the rolling direction may be 0.90 or more.

(4) In the non-oriented electrical steel sheet according to any one of (1) to (3), a tensile strength may be $(230+100\times([Si]+0.5\times[sol. Al]))$ MPa or more and an elongation may be less than 20%, where [Si] is a Si content in terms of % by mass in the non-oriented electrical steel sheet and [sol. Al] is a sol. Al content in terms of % by mass in the non-oriented electrical steel sheet.

(5) A segmented stator according to another aspect of the present invention is a segmented stator for a rotating electrical machine segmented into a plurality of stator pieces in a circumferential direction including: a cylindrical yoke extending in an axial direction; and a plurality of teeth, extending in a radial direction from an inner circumferential surface of the yoke, wherein each of the stator pieces is formed by laminating a plurality of non-oriented electrical steel sheets, when directions in which the teeth extend are defined as a reference of crystal axes, an X-ray random intensity ratio of a {110} <001> orientation of the stator piece is 5 or more, an average crystal grain size of the non-oriented electrical steel sheet is 100 to 200 μm, and a chemical composition of the non-oriented electrical steel sheet contains, in terms of % by mass, C: 0.0015% or less; and Si: 2.5 to 4.0%.

(6) In the segmented stator according to (5), a value of B50/Bs in, directions in which the teeth of the stator piece extend may be 0.85 or more, and a Young's modulus E (GPa) of the yoke in a circumferential direction may satisfy the following Expression (i): E≥205−3.3×[Si]+10 . . . (i), where [Si] in the foregoing Expression represents a Si content in terms of % by mass in the non-oriented electrical steel sheet.

(7) In the segmented stator according to (5) or (6), the chemical composition of the non-oriented electrical steel sheet may contain, in terms of % by mass, C: 0.0015% or less; Si: 2.5 to 4.0%; Mn: 0.05 to 2.0%; sol. Al: 0.0005 to 1.50%; P: 0.080% or less; S: 0.0030% or less; Ti: 0.0030% or less; Ni: 0 to 0.10%; Cu: 0 to 0.10%; Cr: 0 to 0.10%; Sn: 0 to 0.20%; Ca: 0 to 0.0050%; Mg: 0 to 0.0050%; REM: 0 to 0.0050%; and the balance: Fe and impurities.

(8) A rotating electrical machine according to another aspect of the present invention includes: the segmented stator according to any one of (5) to (7); a rotor disposed on an inner circumference side of the segmented stator; and a case which is in close contact with the plurality of stator pieces from an outer circumference of the yoke and fixes the stator pieces.

Advantageous Effects of Invention

According to the aspect of the present invention, it, is possible to obtain a non-oriented electrical steel sheet which has excellent workability and magnetic characteristics after strain relief annealing, a segmented stator which has excellent magnetic characteristics in which deformation caused by a compressive stress in a circumferential direction is minimized, and which has high dimensional accuracy, and a rotating electrical machine which includes the segmented stator.

EMBODIMENTS OF THE INVENTION

The inventors of the present invention have conducted research to achieve the object. As a result, the following findings were obtained.

A compressive stress in a circumferential direction is applied to yoke portions of stator pieces, which causes deformation. However, it is possible to increases a Young's modulus of a yoke in the circumferential direction and reduce an amount of elastic deformation using a steel sheet in which {110} <001> orientation is dominant (also referred to as a "Goss orientation" in the following description).

In addition, since a steel sheet in which Goss orientation is dominant has excellent magnetic characteristics, it is possible to improve the magnetic characteristics in a teeth portion.

Here, as described above, in a non-oriented electrical steel sheet having a high Si content, Goss orientation is not dominant in some cases even if a skin pass rolling is performed. Thus, as a result of investigating the characteristics of steel sheets produced under various conditions by the inventors, it has been found that, even if there is a high Si content, Goss orientation can be stably made dominant after strain relief annealing by causing decarburization in a finish annealing step before the skin pass rolling to reduce a C content.

The present invention was made on the basis of the above-described findings. A non-oriented electrical steel sheet, a segmented stator, and a rotating electrical machine including the segmented stator according to the embodiment of the present invention will be described below with reference to the drawings.

1. Overall Constitution

Figure 1:
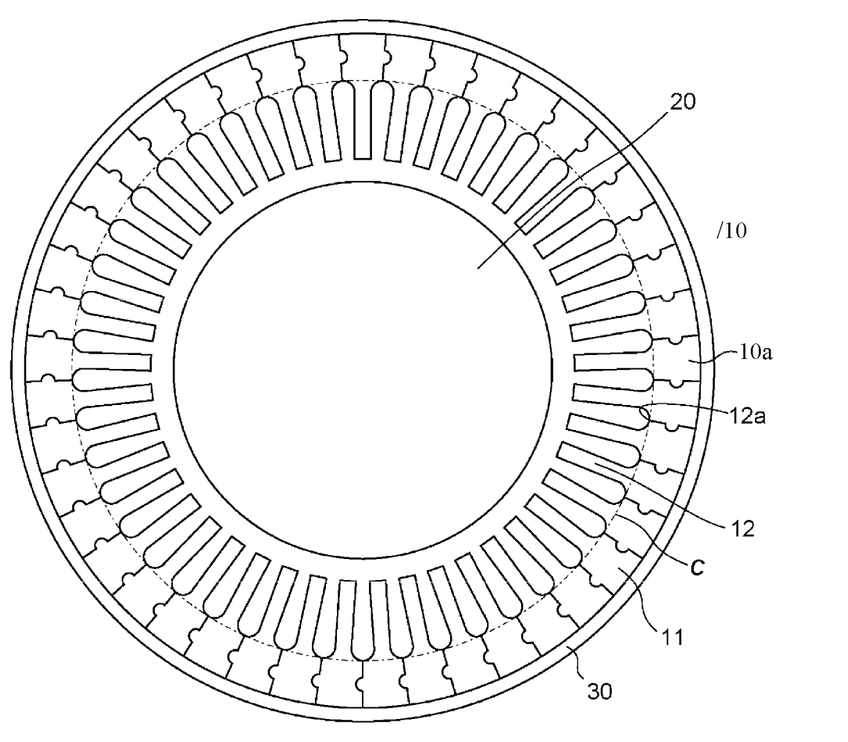
FIG. 1 is a diagram illustrating a constitution of a rotating electrical machine according to an embodiment of the present invention.

FIG. 1 is a diagram illustrating a constitution of the rotating electrical machine according to the embodiment of the present invention. A rotating electrical machine 100 includes a segmented stator 10, a rotor 20, and a case 30.

The segmented stator 10 includes a plurality of stator pieces 10a segmented in the circumferential direction, a cylindrical yoke 11 extending in an axial direction, and a plurality of teeth 12 extending in a radial direction from an inner circumferential surface of the yoke 11. In the embodiment, a virtual circle C passing through groove bottoms 12a between the teeth 12 is defined as a boundary between the yoke 11 and the teeth 12. Furthermore, although 45 teeth are provided in the embodiment, the present invention is not limited thereto, and for example, the number of teeth may be 12, 18, or the like.

In the embodiment, the segmented stator 10 is composed of the 45 segmented stator pieces 10a in the circumferential direction. That is to say, one of the teeth 12 is provided for each of the stator pieces 10a. Furthermore, all of the stator pieces 10a have the same constitution. In addition, each of the stator pieces 10a is formed, for example, by laminating a plurality of non-oriented electrical steel sheets (the non-oriented electrical steel sheet according to the embodiment) having the same shape.

The rotor 20 is disposed on an inner circumference side of the segmented stator 10 so that a center of axis (a center of rotation) thereof coincides with a center of axis of the segmented stator 10. Furthermore, the case 30 is in close contact with the plurality of stator pieces 10a from an outer circumference of the yoke 11 and fixes the stator pieces 10a. The case 30 is brought into close contact with the stator pieces 10a through, for example, shrink fitting. At this time, a force is applied to the stator pieces 10a by the case 30 from the outer circumference side.

2. Non-Oriented Electrical Steel Sheet 2-1. Chemical Composition

A chemical composition of the non-oriented electrical steel sheet according to the embodiment which is appropriate for forming each of the stator pieces needs to contain, in terms of % by mass C: 0.0015% or less and Si: 2.5 to 4.0%. The reasons for each limitation will be explained. In the following description, "%" for content means "% by mass".

C: 0.0015% or less:

C is an element which contributes to increasing a strength of a steel sheet. However, in the embodiment, when a C content is reduced, even when a Si content increases, a dominant Goss orientation can be stably obtained after strain relief annealing. It is conceivable that this is, because, when a high C content is provided, TiC precipitates during strain relief annealing, grain boundary movement is temporarily pinned, and the strain required for strain-induced grain, growth is lost through recovery during the time. Therefore, the C content is 0.0015% or less. The C content is preferably 0.0013% or less, and more preferably 0.0010% or less. Although a lower limit of the C content, is not limited, an excessive reduction of the C content leads to, an increase in productions costs. For this reason, the C content is preferably 0.0001% or more, and more preferably 0.0005% or more.

Si: 2.5 to 4.0%:

Si is an element which increases an electrical resistance of steel and improves iron loss. Furthermore. Si is an element which is also effective for increasing a strength of steel sheet because it has a large solid solution strengthening ability. For this reason, the Si content is 2.5% or more. The Si content is preferably 2.8% or more.

On the other hand, if an excessive Si content is provided, there is a concern concerning a workability significantly deteriorating, making it difficult to perform cold rolling. Therefore the Si content is 4.0% or less. The Si content is preferably 3.7% or less.

Although there are no particular limitations regarding the chemical composition other than those for C and Si, it is desirable that the chemical composition of the non-oriented electrical steel sheet according to the embodiment contain, for example, in terms of % by mass, C: 0.0015% or less, Si: 2.5 to 4.0%, Mn: 0.05 to 2.0%, sol. Al: 0.0005 to 1.50%, P: 0.080% or less, S: 0.0030% or less, Ti: 0.0030% or less, Ni: 0 to 0.10%, Cu: 0 to 0.10%, Cr: 0 to 0.10%, Sn: 0 to 0.20%, Ca: 0 to 0.0050%, Mg: 0 to 0.0050%, REM: 0 to 0.0050%, and the balance: Fe and impurities.

The reasons for limitations of each of the elements are as follows.

Mn: 0.05 to 2.0%:

Mn is an element which increases an electrical resistance of steel and improves iron loss. Furthermore, when a Mn content is too low, in addition to the small effect of increasing the electrical resistance, there is a concern concerning grain growth properties deteriorating during finish annealing due to precipitation of fine sulfide (MnS). For this reason, the Mn content is preferably 0.05% or more. The Mn content is preferably 0.1% or more, and more preferably 0.2% or more.

On the other hand, if an excessive Mn content is provided, there is a concern concerning a magnetic flux density which decreases. Therefore, the Mn content is 2.0% or less. The Mn content is more preferably 1.5% or less.

Sol. Al: 0.0005 to 1.50%:

Al is an element which increases an electrical resistance of steel and improves iron loss. For this reason, an Al content is preferably 0.0005% or more, and more preferably 0.15% or more.

On the other hand, if an excessively Al content is provided, there is a concern concerning a magnetic flux density which decreases. Therefore, the Al content is preferably 1.50% or less, and more preferably 1.00% or less. In the embodiment, the Al content means a sol. Al (acid-soluble Al) content.

P: 0.080% or less:

If P is contained in steel as an impurity and there is an excess P content, there is a concern concerning the ductility of a steel sheet which significantly decreases. Therefore, a P content is preferably 0.080% or less. The P content is more preferably 0.050% or less.

S: 0.0030% or less:

S is an element which increases iron loss by forming fine precipitates of MnS and deteriorates the magnetic characteristics of the steel sheet. Therefore, a S content is preferably 0.0030% or less. The S content is more preferably 0.0015% or less.

On the other hand, since there is a concern concerning an extreme reduction of the S content which leads to an increase in producing cost, the S content is preferably 0.0001% or more, more preferably 0.0003% or more, and still more preferably 0.0005% or more.

Ti: 0.0030% or less:

Ti is an element which is inevitably incorporated and can, combine with carbon or nitrogen to form precipitates (carbides or nitrides). When carbides or nitrides have been formed, there is a concern concerning these precipitates themselves which deteriorate the magnetic characteristics. In addition, there is a concern that precipitates inhibits the growth of crystal grains during finish annealing and magnetic characteristics deteriorates. Therefore the Ti content is preferably 0.0030% or less. The Ti content is more preferably 0.0020% or less.

On the other hand, since there is a concern concerning an excessive reduction of the Ti content which leads to an increase in producing cost, the Ti content is preferably 0.0005% or more.

Ni: 0 to 0.10%;
Cu: 0 to 0.10%:
Cr: 0 to 0.10%:
Sn: 0 to 0.20%:
Ca: 0 to 0.0050%:
Mg: 0 to 0.0050%:
REM: 0 to 0.0050%:

Ni, Cu, Cr, Sn, Ca, Mg, and REM are elements which are inevitably incorporated. On the other hand, since these elements are also elements which improve the magnetic characteristics, these elements may be intentionally included.

When the effect of improving the magnetic characteristics is desired to be obtained, it is desirable that one or more selected from Ni: 0.01% or more, Cu: 0.01% or more, Cr: 0.01% or, more, Sn: 0.01% or more, Ca: 0.0005% or more, Mg: 0.0005% or more, and REM: 0.0005% or more be contained.

Here, if excess amounts of these elements are included, there is concern that the economic efficiency deteriorates. Thus, if excess amounts of these elements are intentionally included, these are desirably Ni: 0.10% or less. Cu: 0.10% or less, Cr: 0.10% or less, Sn: 0.20% or less, Ca: 0.0050% or less, Mg: 0.0050% or less, and REM: 0.0050% or less.

In the chemical composition of the non-oriented electrical steel sheet according to the embodiment, the balance contains Fe and impurities. Here, "impurities" mean components which are mixed in when steel is produced industrially due to various factors in raw materials such as ore and scrap, but are permissible as long as the non-oriented electrical steel sheet according to the embodiment is not adversely affected.

2-2. Average Crystal Grain Size

The non-oriented electrical steel sheet according to the embodiment has an average crystal grain size of 10 to 40 µm. If the average crystal grain size is less than 10 µm, this is not desirable because there is a concern that the number of crystal grains of a crystal orientation having anisotropy desired to be coarsened is not sufficient. On the other hand, if the average crystal grain size, exceeds 40 µm, this is not desirable because there is a concern that the start of the strain-induced grain growth is delayed and anisotropy is not obtained after strain relief annealing.

The average crystal grain size of the non-oriented electrical steel sheet according to the embodiment is measured in accordance with JIS G 0551:2013 "Steel-micrographic determination of apparent grain size".

2-3. Internal Oxidation Layer

In the non-oriented electrical steel sheet according to the embodiment, an internal oxidation layer having a thickness 0.5 μm or more and 3.0 μm or less in a sheet thickness direction from a surface is formed.

When the internal oxidation layer is formed and present, the non-oriented electrical steel sheet is easily cut through punching or cutting processing and the dimensional accuracy of the processing is improved. When the internal oxidation layer is not formed or the thickness of the internal oxidation layer is thin, workability deteriorates. On the other hand, when the internal oxidation layer has a thickness that exceeds 3.0 μm, it is not desirable because the growth of crystal grains is inhibited and the magnetic characteristics after strain relief annealing deteriorate.

It is possible to form the internal oxidation layer by performing decarburization during finish annealing.

It is possible to measure the thickness of the internal oxidation layer by polishing a cross section of the steel sheet and observing the cross section through an SEM or the like. Since the thickness of the internal oxidation layer Varies in each place in some cases, for example, it is desirable to take an average value of total thicknesses measured in a plurality of fields of view which are three or more fields of view using a range of 10 μm or more in a width direction in a C-direction cross section as one field of view.

2-4. Anisotropy of Young's Modulus

If a Goss orientation is dominant before the non-oriented electrical steel sheet is processed to have a shape of each of the stator pieces of the segmented stator, anisotropy of a Young's modulus occurs, and workability deteriorates, for example, the roundness of a hole during punching processing deteriorates or the dimensional accuracy and an amount of sagging during processing differ significantly with the teeth of the segmented stator in a yoke direction. For this reason, it is desirable that the non-oriented electrical steel sheet do not have anisotropy at a stage of performing processing into a stator piece. In the non-oriented electrical steel sheet according to the embodiment, $E_L/E_c$ which is a ratio between a Young's modulus $E_L$ in the rolling direction and a Young's modulus $E_c$ in a direction perpendicular to the rolling direction is preferably 0.90 or more. If the anisotropy of the Young's modulus increases, workability deteriorates. An upper limit of $E_L/E_c$ is preferably 1.0, and $E_L/E_c$ may be 0.95 or less.

On the other hand, it is desirable that in the non-oriented electrical steel sheet, a structure is changed so that Goss orientation is dominant at a stage in which the non-oriented electrical steel sheet is incorporated into the segmented stator after strain relief annealing.

2-5. Mechanical Properties

It is desirable that the non-oriented electrical steel sheet according to the embodiment have tensile strength of (230+100×([Si]+0.5×[sol. Al])) MPa or more and an elongation (total elongation) of less than 20%. When a high strength and a low elongation are provided, a cross section having a good dimensional accuracy with little sagging is provided during processing and workability is improved. Here, [Si] corresponds to the Si content in terms of % by mass in the non-oriented electrical steel sheet and [sol. Al] corresponds to the sol. Al content in terms of % by mass in the non-oriented electrical steel sheet.

The tensile strength and the elongation are measured in accordance with JIS Z2241:2011 "Metallic materials-Tensile testing". A shape of a test piece is not particularly limited. When sampling is performed from the non-oriented electrical steel sheet, for example, the shape of the test piece may be formed in accordance with JIS13B and collected so that a longitudinal direction of the test piece is parallel to the rolling direction.

3. Segmented Stator

The segmented stator 10 according to the embodiment is a segmented stator for the rotating electrical machine 100 which is segmented into the plurality of stator pieces 10a in the circumferential direction and includes the cylindrical yoke 11 extending in the axial direction and the plurality of teeth 12 extending in the radial direction from the inner circumferential surface of the yoke 11. In addition, the stator pieces 10a are formed by laminating, a plurality of non-oriented electrical steel sheets, and when directions in which the teeth 12 extend are used as a reference for a crystal axis, an X-ray random intensity ratio of a {110} <001> orientation of the stator pieces 10a is 5 or more, the average crystal grain size of the non-oriented electrical steel sheet is 100 to 200 μm, and the chemical composition of the non-oriented electrical steel sheet contains, in terms of % by mass, C: 0.0015% or less and Si: 2.5 to 4.0%.

It is desirable that the chemical composition of the non-oriented electrical steel sheet contain, in terms of % by mass, C: 0.0015% or less, Si: 2.5 to 4.0%, Mn: 0.05 to 2.0%, sol. Al: 0.0005 to 1.50%, P: 0.080% or less, S: 0.0030% or less, Ti: 0.0030% or less. Ni: 0 to 0.10%, Cu: 0 to 0.10%, Cr: 0 to 0.10%, Sn: 0 to 0.20%, Ca: 0 to 0.0050%, Mg: 0 to 0.0050%, REM: 0 to 0.0050% the balance: Fe and impurities.

It is desirable that all of the plurality of non-oriented electrical steel sheets to be laminated be the non-oriented electrical steel sheets according to the embodiment.

3-1. Anisotropy

In the stator piece 10a, a Goss orientation is dominant, and specifically, has the X-ray random intensity ratio of the {110} <001> orientation of the stator pieces 10a of 5 or more. When the Goss orientation is dominant, it is possible to improve the magnetic characteristics, increase the Young's modulus of the yoke portion in the circumferential direction, and reduce an amount of elastic deformation. The X-ray random intensity ratio of the {110} <001> orientation is preferably 8 or more.

An upper limit of the X-ray random intensity ratio does not need to be limited, but may be a substantial upper limit of 20.

The X-ray random intensity ratio of the {110} <001> orientation is measured using X-ray diffraction. When the measurement is performed, directions in which the teeth extend are defined as a reference of a crystal axis.

Also, the X-ray random intensity ratio is a numerical value obtained by measuring X-ray intensities of a standard sample (for example, a sample or the like obtained by sintering an Fe powder) in which accumulation is not provided in a specific orientation and a test, material using an X-ray diffraction method or the like under the same conditions and dividing the obtained X-ray intensity of the test material by the X-ray intensity of the standard sample.

When the X-ray random intensity ratio of the stator piece provided in the segmented stator is measured, the segmented stator is disassembled and a single-plated non-oriented electrical steel sheet is taken out and measured.

3-2. Average Crystal Grain Size of Non-Oriented Electrical Steel Sheet Constituting Stator Piece An average crystal grain size of a non-oriented electrical steel sheet constituting each of the stator pieces is 100 to 200 µm. If the average crystal grain size is less than 100 µm, hysteresis loss increases and iron loss deteriorates. The average crystal grain size is more preferably 120 µm or more. On the other hand, if the average crystal grain size exceeds 200 µm, eddy current loss increases and iron loss deteriorates. The average crystal grain size is more preferably 170 µm or less.

In the average crystal grain size of the non-oriented electrical steel sheet constituting each of the stator pieces, the average crystal grain size is measured in accordance with JIS G 0551:2013 "Steel-micrographic determination of apparent grain size".

When the average crystal grain size of the stator piece included in the segmented stator is measured, the segmented stator is disassembled and a single-plated non-oriented electrical steel sheet is taken out and measured.

3-3. Chemical Composition of Non-Oriented Electrical Steel Sheet Constituting Stator Piece Since the chemical composition of the non-oriented electrical steel sheet constituting the stator piece, does not change due to processing or strain relief annealing, the range and the reason for limitation are the same as those of the non-oriented electrical steel sheet used as a material.

3-4. Characteristics

As described above, each of the stator pieces constituting the segmented stator according to the embodiment has a dominant Goss orientation. For this reason, the stator piece has excellent magnetic characteristics and a high Young's modulus E in the circumferential direction of the yoke portion.

To be specific, it is desirable that the magnetic characteristics in which a value of B50/Bs in directions in which the teeth of the stator piece extend is 0.85 or more be provided. Furthermore, it is desirable that a Young's modulus E (GPa) of the yoke n the circumferential direction satisfy the following Expression (i) in a relationship between the Si content and the Young's modulus F:

$$E \geq 205 - 3.3 \times [Si] + 10 \quad (i).$$

Here, [Si] in the foregoing Expression represents the Si content (% by mass) in the non-oriented electrical steel sheet constituting the stator piece.

4. Rotating Electrical Machine

As illustrated in FIG. 1, the rotating electrical machine 100 according to the embodiment includes the segmented stator 10 according to the embodiment described above, the rotor 20 disposed on the inner circumference side of the segmented stator 10, and the case 30 which is in close contact with the plurality of stator pieces 10a from the outer circumference of the yoke 11 and fixes the stator pieces.

In the rotating electrical machine, a low anisotropy of a Young's modulus of the non-oriented electrical steel sheet during punching processing is provided. Thus, an excellent punching dimensional accuracy is provided. In addition, there is little elastic deformation during shrink fitting due to a high Young's modulus in the yoke direction after strain relief annealing. For this reason, an excellent dimensional accuracy as an integrated core is provided. Furthermore, since the high magnetic flux density in teeth directions is provided reduced copper loss and excellent motor efficiency are provided.

6. Production Method

Although a method for producing the non-oriented electrical steel sheet according to the embodiment, the segmented stator according to the embodiment, and the rotating electrical machine according to the embodiment is not particularly limited, the production can be performed using a method which will be described later.

6-1 Production Method of Non-Oriented Electrical Steel Sheet

There is no particular limitation regarding the method for producing a non-oriented electrical steel sheet which is appropriate as a material of the segmented stator. For example, the non-oriented electrical steel sheet can be obtained using a production method including the following steps:

(I) a step of obtaining a hot-rolled sheet by heating a slab containing a prescribed chemical composition and then subjecting the slab to hot rolling (a hot rolling step);

(II) a step of subjecting the hot-rolled sheet to hot-rolled sheet annealing as necessary (a hot-rolled sheet annealing step);

(III) a step of obtaining a cold-rolled sheet by subjecting pickling and cold rolling the hot-rolled sheet which has been subjected to the hot oiling step or the hot-rolled sheet annealing step (a cold rolling step);

(IV) a step of subjecting the cold-rolled sheet to finish annealing (a finish annealing step); and (V) a step of subjecting the cold-rolled sheet which has been subjected to the finish annealing step to skin pass rolling (a skin pass step).

(Hot Rolling Step)

In the hot rolling step, a hot-rolled sheet is obtained by heating a slab and subjecting the slab to hot rolling.

As described above, the C content of the non-oriented electrical steel sheet in the state of the segmented stator needs to be 0.0015% or less. However, when the C content has been low from a molten steel stage, a Goss orientation after strain relief annealing is not dominant. Although the crystal grains of the Goss orientation are preferentially grown when the strain relief annealing is performed, if the C content has been low from the molten steel stage, the number of Goss orientation grains which are nuclei of growth is reduced and a Goss orientation is not dominant after strain relief annealing Similarly, even when the C content is reduced by performing decarburization annealing before finish annealing, a Goss orientation is not dominant after strain relief annealing.

For this reason, the C content at a steelmaking stage is 0.0025 to 0.0100% (the C content in the slab is 0.0025 to 0.0100%). Since the content of the elements other than C does not change during the manufacturing step, it can be adopted as long as a slab having components that are the same as the components of a target non-oriented electrical steel sheet can be used.

The hot rolling conditions are not particularly limited. The conditions may be determined in accordance with the thickness and characteristics to be required.

(Hot-Rolled Sheet Annealing Step)

The hot-rolled sheet obtained using the hot rolling may be subjected to hot-rolled sheet annealing as necessary. When the hot-rolled sheet annealing is performed, deterioration of surface quality due to rigging can be prevented and a Goss orientation is more dominant after strain relief annealing. Thus, the execution of the hot-rolled sheet annealing is preferable.

(Cold Rolling Step)

In the cold rolling step, a cold-rolled sheet is obtained by subjecting pickling and cold rolling the hot-rolled sheet which has been subjected to the hot rolling step or the hot-rolled sheet annealing step. Although the cold rolling conditions are not particularly limited, if a temperature of the steel sheet is 150° C. or more before cold rolling or while cold rolling is being performed, the cracking of the steel sheet is prevented and a Goss orientation becomes dominant during strain relief annealing. Thus, the temperature of the steel sheet which is 150° C. or more is preferable.

(Finish Annealing Step)

In the method for producing the non-oriented electrical steel sheet according to the embodiment, decarburization is performed, in the finish annealing step. To be specific, the decarburization is performed by setting an annealing atmosphere in the finish annealing step to satisfy a condition in which the following Expression (ii) is satisfied in a temperature range in which an annealing temperature is 650° C. or more.

Through the finish annealing step, it is possible to prevent the formation of carbides which inhibit the growth of the Goss orientation during strain, relief annealing. Furthermore, the internal oxidation layer, is formed:

$$0.05 < P_{H2O}/P_{H2} \quad \text{(ii)}$$

Here, symbols in the foregoing Expression mean as follows:

$P_{H2O}$: partial pressure of water vapor (atm), and $P_{H2}$: partial hydrogen pressure (atm).

When the annealing temperature is low or the annealing atmosphere does not satisfy Expression (ii), sufficient decarburization is not performed. Furthermore, if the annealing temperature exceeds 900° C., the average crystal grain size is easily more than 40 μm. Thus, the annealing temperature which exceeds 900° C. is not preferable.

(Skin Pass Step)

The cold-rolled sheet which has been subjected to the finish annealing step is subjected to skin pass rolling. A rolling reduction ratio in the skin pass rolling is preferably 1 to 10%. If the rolling reduction ratio is less than 1%, a sufficient amount, of strain required for the strain-induced grain growth is not provided. On the other hand, if the rolling reduction ratio exceeds 10%, the uniformity of an amount of strain for each crystal orientation is lost and becomes uniform. In this case, a sufficient Goss orientation does not increase during strain relief annealing.

When the decarburization during finish annealing and skin pass rolling are combined, also in the case of the steel sheet containing 2.5% or more of Si, a Goss orientation is dominant after strain relief annealing.

6-2. Production Method of Segmented Stator

The segmented stator according to the embodiment can be obtained by further performing the following steps using the above non-oriented electrical steel sheet as a material:

(VI) a step of making a non-oriented electrical steel, sheet have a shape of a stator piece of a segmented stator by punching processing (a punching step):

(VII) a step of obtaining a stator piece by laminating a plurality of non-oriented electrical steel sheets which have been subjected to the punching step (a lamination step);

(VIII) a step of subjecting a stator piece to strain relief annealing (a strain relief annealing step); and (IX) a step of forming an integrated segmented stator by arranging stator pieces in an annular shape (a segmented stator integration step).

(Punching Step)

The non-oriented electrical steel sheet is made have a shape of each of the stator pieces of the segmented stator by punching processing. The punching conditions are not particularly limited. For example, the producing can be performed consistently until the next lamination step using a progressive die.

(Lamination Step)

A stator piece is formed by laminating a plurality of the non-oriented electrical steel sheets which have been subjected to the punching step. Although there are methods such as caulking, adhesives, and welding as a fixing, method at the time of laminating, the present invention is not particularly limited.

(Strain Relief Annealing Step)

In the strain relief annealing step, the whole heating is performed in a temperature range of 750 to 900° C. for 0.5 to 5 hours. A soaking time is a time at which a stator piece is at 750° C. or more and a heating-up time and a cool-down time at which a stator piece is less than 750° C. may be appropriately set.

If a strain relief annealing temperature exceeds 900° C. or the soaking time exceeds 5 hours, a crystal grain size exceeds 200 μm. Furthermore, if the strain relief annealing temperature is less than 750° C. or the soaking time is less than 0.5 hours, the crystal grain size is less than 100 μm. In addition, the growth of crystal grains itself during strain relief annealing is suppressed, a region in which the crystal orientation does not change from that before the strain relief annealing is left, and a sufficient Goss orientation is not provided after strain relief annealing.

(Segmented Stator Integration Step)

An integrated segmented stator is obtained by arranging the stator pieces which have been subjected to strain relief annealing so that the stator pieces are arranged in an annular shape, the yokes are brought into contact with each other, and the teeth are directed in a center direction of the circle, and integrating the segmented stators using shrink fitting.

6-4. Production Method of Rotating Electrical Machine

In the rotating electrical machine according to the embodiment, a rotating electrical machine can be obtained by winding a wire on the segmented stator according to the embodiment and combining the segmented stator with a rotor. Although the winding of a wire may be performed after the integration, if integration is performed after the winding of a wire has been performed at a stage of the stator piece after strain relief annealing, the effects of improving a space factor for the winding of a wire and improving workability are achieved. Thus, the integration is performed after the winding of a wire has been performed is preferable.

Although the present invention will be described in more detail below using Examples, the present invention is not limited to these Examples.

EXAMPLES

A hot-rolled sheet was obtained by heating a slab having the chemical composition shown in Table 1 to 1150° C., subjecting the slab to hot rolling at a finishing temperature of 800° C. to have a finishing sheet thickness of 2.2 mm, and coiling the sheet at 700° C. The obtained hot-rolled sheet was subjected to hot-rolled sheet annealing held at 950° C. for 40 seconds and a surface scale was removed through pickling. Furthermore, a cold-rolled sheet having a sheet thickness of 0.3 mm was obtained by subjecting the steel sheet to cold rolling.

After that, adjustment was performed so that the C contents shown in Table 2 were obtained by performing annealing by changing the finish annealing conditions (an annealing temperature, a soaking time, and a finish annealing atmosphere) as shown in Table 2.

Then, a non-oriented electrical steel sheet was obtained by performing skin pass rolling under the conditions shown in Table 2 so that a longitudinal, direction of the teeth is the rolling direction.

Here, as a result of measuring the chemical compositions of the non-oriented electrical steel sheet using an ICP, the contents of the elements other than the C content were substantially the same as those, at the slab.

In addition, the thickness (an average thickness) of the internal oxidation layer was measured by observing a C-direction cross section through an SEM for three fields of view using 10 μm in the width direction as one field of view.

Furthermore, a test piece having a length of 50 mm and a width of 5 mm was cut from a non-oriented electrical steel sheet, and then a Young's modulus thereof in the rolling direction and a Young's modulus thereof in the direction perpendicular to the rolling direction were measured using a "free resonance method".

In addition, a JIS13B test piece was collected so that a longitudinal direction of the test piece was parallel to the

TABLE 1

| Type of steel | Chemical composition (% by mass, balance: Fe and impurities) | | | | | | | | | | | | | |
|---|---|---|---|---|---|---|---|---|---|---|---|---|---|---|
| | C | Si | Mn | sol. Al | P | S | Ti | Ni | Cu | Cr | Sn | Ca | Mg | REM |
| A | 0.0036 | 3.4 | 0.6 | 0.33 | 0.013 | 0.0008 | 0.0011 | — | — | — | — | — | — | — |
| B | 0.0043 | 3.7 | 0.8 | 0.26 | 0.018 | 0.0014 | 0.0007 | 0.03 | 0.06 | 0.05 | 0.02 | 0.0011 | — | 0.0018 |
| C | 0.0055 | 3.1 | 1.3 | 0.74 | 0.071 | 0.0022 | 0.0018 | 0.06 | — | — | 0.07 | — | 0.0006 | 0.0024 |
| D | 0.0039 | 2.8 | 0.2 | 1.43 | 0.024 | 0.0011 | 0.0016 | — | 0.03 | 0.07 | — | — | — | — |
| E | 0.0074 | 3.2 | 0.5 | 0.54 | 0.008 | 0.0017 | 0.0013 | 0.04 | — | 0.07 | — | 0.0021 | — | — |
| F | 0.0028 | 3.3 | 0.1 | 0.80 | 0.014 | 0.0015 | 0.0008 | — | 0.02 | — | 0.03 | — | — | — |
| G | 0.0034 | 3.1 | 1.5 | 0.45 | 0.021 | 0.0016 | 0.0011 | 0.03 | 0.04 | — | 0.04 | — | — | 0.0033 |
| H | 0.0031 | 3.5 | 1.5 | 0.001 | 0.009 | 0.0006 | 0.0007 | — | — | — | 0.02 | — | — | — |
| I | 0.0091 | 3.1 | 0.3 | 0.71 | 0.011 | 0.0008 | 0.0026 | — | — | — | — | 0.0011 | — | — |
| J | 0.0041 | 2.6 | 1.1 | 1.24 | 0.024 | 0.0026 | 0.0008 | 0.09 | 0.08 | — | 0.16 | 0.0035 | — | 0.0013 |
| K | 0.0036 | 3.9 | 0.2 | 0.001 | 0.009 | 0.0006 | 0.0007 | — | — | 0.09 | — | — | — | — |
| L | 0.0063 | 3.3 | 0.06 | 0.61 | 0.031 | 0.0006 | 0.0019 | 0.07 | 0.09 | 0.03 | — | 0.0013 | 0.0005 | 0.0047 |
| M | 0.0046 | 3.1 | 1.9 | 0.81 | 0.015 | 0.0027 | 0.0013 | 0.05 | 0.03 | 0.06 | 0.02 | — | — | — |
| N | 0.0037 | 2.1 | 0.5 | 0.30 | 0.014 | 0.0011 | 0.0015 | 0.03 | 0.02 | 0.06 | — | — | — | — |

TABLE 2

| | | Producing conditions | | | | |
|---|---|---|---|---|---|---|
| | | Finish annealing soaking condition | | Finish annealing | C content after | Skin pass rolling |
| Test No. | Type of steel | Temperature (° C.) | Time (second) | atmosphere $P_{H2O}/P_{H2}$ | finish annealing (% by mass) | reduction ratio (%) |
| 1 | A | 800 | 20 | 0.06 | 0.0013 | 5 |
| 2 | | 830 | 7 | 0.03 | 0.0021 | 5 |
| 3 | | 840 | 7 | 0.06 | 0.0012 | — |
| 4 | | 770 | 28 | 0.07 | 0.0011 | 5 |
| 5 | | 920 | 6 | 0.05 | 0.0014 | 5 |
| 6 | | 820 | 20 | 0.06 | 0.0013 | 13 |
| 7 | | 890 | 30 | 0.11 | 0.0011 | 7 |
| 8 | | 910 | 15 | 0.07 | 0.0011 | 2 |
| 9 | B | 800 | 25 | 0.07 | 0.0013 | 5 |
| 10 | C | 810 | 22 | 0.11 | 0.0011 | 5 |
| 11 | D | 800 | 22 | 0.06 | 0.0011 | 5 |
| 12 | E | 810 | 13 | 0.12 | 0.0014 | 5 |
| 13 | F | 790 | 22 | 0.06 | 0.0012 | 5 |
| 14 | G | 810 | 15 | 0.07 | 0.0011 | 5 |
| 15 | H | 800 | 15 | 0.07 | 0.0011 | 5 |
| 16 | I | 830 | 17 | 0.12 | 0.0014 | 9 |
| 17 | J | 890 | 10 | 0.06 | 0.0013 | 7 |
| 18 | K | 840 | 15 | 0.08 | 0.0013 | 5 |
| 19 | L | 780 | 22 | 0.07 | 0.0011 | 5 |
| 20 | M | 820 | 13 | 0.09 | 0.0014 | 5 |
| 21 | N | 840 | 8 | 0.06 | 0.0014 | 5 |

An average crystal grain size of the obtained non-oriented electrical steel sheet was measured. The average crystal grain size was measured in accordance with JIS G 0551: 2013 "Steel-micrographic determination of apparent grain size".

rolling direction and tensile strength and elongation were measured in accordance with JIS Z2241:2011 "Metallic materials-Tensile testing".

Subsequently, an insulating film was formed on the surface of the non-oriented electrical steel sheet. The insulating film was formed by applying an insulating film composed of aluminum phosphate and an acrylic-styrene copolymer resin emulsion having a particle size of 0.2 μm to have a predetermined adhesion amount and baking the insulating film at 350° C. in the air.

After that, the obtained non-oriented electrical steel sheet was punched to have a predetermined shape and laminated.

At the time of punching, when an error for a punching dimension with respect to a mold dimension was 10 μm or less, it was determined that an excellent workability was achieved (OK). When the dimension error was more than 10 μm, it was determined that a workability was inferior (NG). At that time, punching was performed so that the longitudinal direction of the teeth was the rolling direction.

After lamination, a stator piece was obtained by subjecting the obtained non-oriented electrical steel sheet to strain relief annealing (SRA) at an annealing temperature of 800° C. for a soaking time of 1 hour.

An average crystal grain size of the obtained stator piece was measured in accordance with JIS G 0551:2013 "Steel-micrographic determination of apparent grain size". Furthermore, an X-ray random intensity ratio of the stator pieces in a {110} <001> orientation was measured through X ray diffraction, using teeth extending directions when the stator pieces are used as a segmented stator as a reference of a crystal axis.

The magnetic characteristics were evaluated using a ratio (B50/Bs) between a magnetic flux density B50 and a saturated magnetic flux density Bs when a 55 mm square single-plated test piece was excited at 5000 A/m in a rolling direction thereof and iron loss $W_{10/400}$ when the 55 mm square single-plated test piece was excited at 1.0T-400 Hz, the 55 mm square single-plated test piece being obtained by annealing a non-oriented electrical steel sheet punched out from the stator piece under conditions which are the same as the stator piece.

If B50/Bs was 0.85 or more and the iron loss $W_{10/400}$ was 12 W/kg or less, it was determined that excellent magnetic characteristics were obtained.

Also in order to measure a Young's modulus, one steel sheet was collected from the stator pieces so that a Young's modulus of a yoke in a circumferential direction could be measured, and a test piece having a length of 50 mm and a width of 5 mm was cut out and then was subjected to the measurement using a "free resonance method".

These results are also shown in Tables 3 and 4.

TABLE 3

| | | | | | | Steel sheet | | | | |
|---|---|---|---|---|---|---|---|---|---|---|
| Test No. | Type of steel | Internal oxidation layer thickness (μm) | Steel sheet average crystal grain size (μm) | Tensile strength (MPa) | Elongation (%) | $E_L$ (GPa) | $E_C$ (GPa) | $E_L/E_C$ | Workability | |
| 1 | A | 1.2 | 17 | 657 | 15 | 185.2 | 201.4 | 0.92 | OK | |
| 2 | | 0.3 | 18 | 654 | 15 | 183.1 | 201.3 | 0.91 | NG | |
| 3 | | 1.4 | 21 | 597 | 25 | 179.5 | 200.6 | 0.89 | NG | |
| 4 | | 0.7 | 9 | 695 | 15 | 186.5 | 201.6 | 0.93 | OK | |
| 5 | | 1.6 | 48 | 616 | 15 | 180.3 | 198.6 | 0.91 | OK | |
| 6 | | 1.3 | 24 | 721 | 10 | 179.2 | 201.3 | 0.89 | NG | |
| 7 | | 3.1 | 38 | 643 | 11 | 184.1 | 201.5 | 0.91 | OK | |
| 8 | | 2.1 | 54 | 583 | 21 | 182.3 | 198.2 | 0.92 | NG | |
| 9 | B | 1.4 | 19 | 687 | 14 | 183.3 | 199.6 | 0.92 | OK | |
| 10 | C | 1.1 | 21 | 665 | 14 | 184.1 | 200.5 | 0.92 | OK | |
| 11 | D | 1.4 | 18 | 637 | 16 | 185.4 | 201.7 | 0.92 | OK | |
| 12 | E | 1.3 | 16 | 645 | 16 | 182.1 | 200.2 | 0.91 | OK | |
| 13 | F | 1.2 | 14 | 669 | 15 | 186.1 | 200.1 | 0.93 | OK | |
| 14 | G | 1.1 | 18 | 648 | 15 | 181.7 | 200.6 | 0.91 | OK | |
| 15 | H | 1.1 | 16 | 672 | 15 | 182.3 | 200.5 | 0.91 | OK | |
| 16 | I | 2.3 | 23 | 662 | 8 | 186.8 | 201.4 | 0.93 | OK | |
| 17 | J | 1.3 | 31 | 621 | 12 | 187.7 | 203.4 | 0.92 | OK | |
| 18 | K | 1.1 | 24 | 670 | 14 | 183.5 | 200.5 | 0.92 | OK | |
| 19 | L | 1.4 | 13 | 668 | 15 | 185.6 | 201.7 | 0.92 | OK | |
| 20 | M | 1.1 | 19 | 669 | 14 | 185.4 | 201.9 | 0.92 | OK | |
| 21 | N | 1.7 | 23 | 497 | 21 | 185.4 | 204.1 | 0.91 | NG | |

TABLE 4

| | | | Stator pieces | | | | | |
|---|---|---|---|---|---|---|---|---|
| Test No. | Type of steel | X-ray random intensity in {110} <001> orientation | Average crystal grain size (μm) | Magnetic characteristics $W_{10/400}$ (W/kg) | B50 (T) | B50/Bs | Young's modulus E (GPa) | Right side value in Expression (i)† | Remarks |
| 1 | A | 9 | 135 | 11.7 | 1.72 | 0.87 | 205.1 | 203.8 | Example of present invention |
| 2 | | 1 | 146 | 11.6 | 1.65 | 0.83 | 198.2 | 203.8 | Comparative |
| 3 | | 1 | 84 | 12.7 | 1.63 | 0.82 | 193.2 | 203.8 | Examples |
| 4 | | 4 | 114 | 11.8 | 1.67 | 0.84 | 199.6 | 203.8 | |
| 5 | | 3 | 93 | 11.8 | 1.65 | 0.83 | 196.7 | 203.8 | |

TABLE 4-continued

| | | | Stator pieces | | | | | | |
|---|---|---|---|---|---|---|---|---|---|
| Test No. | Type of steel | X-ray random intensity in {110} <001> orientation | Average crystal grain size (μm) | Magnetic characteristics | | | Young's modulus E (GPa) | Right side value in Expression (i)† | Remarks |
| | | | | $W_{10/400}$ (W/kg) | B50 (T) | B50/Bs | | | |
| 6 | | 2 | 86 | 12.6 | 1.66 | 0.84 | 194.4 | 203.8 | |
| 7 | | 4 | 95 | 13.8 | 1.67 | 0.84 | 199.4 | 203.8 | |
| 8 | | 2 | 213 | 13.3 | 1.65 | 0.83 | 197.6 | 203.8 | |
| 9 | B | 8 | 151 | 11.4 | 1.71 | 0.87 | 204.1 | 202.8 | Examples of present invention |
| 10 | C | 9 | 136 | 11.3 | 1.70 | 0.87 | 206.1 | 204.8 | |
| 11 | D | 7 | 142 | 11.7 | 1.69 | 0.86 | 206.3 | 205.8 | |
| 12 | E | 8 | 123 | 11.9 | 1.72 | 0.87 | 205.1 | 204.4 | |
| 13 | F | 6 | 138 | 11.7 | 1.69 | 0.86 | 204.6 | 204.1 | |
| 14 | G | 8 | 126 | 11.5 | 1.71 | 0.87 | 206.1 | 204.8 | |
| 15 | H | 7 | 121 | 11.7 | 1.70 | 0.86 | 205.3 | 203.5 | |
| 16 | I | 9 | 134 | 11.9 | 1.73 | 0.87 | 207.4 | 205.4 | |
| 17 | J | 9 | 122 | 11.5 | 1.70 | 0.87 | 208.3 | 206.4 | |
| 18 | K | 8 | 136 | 11.7 | 1.72 | 0.86 | 204.3 | 202.1 | |
| 19 | L | 8 | 153 | 11.9 | 1.72 | 0.87 | 206.6 | 204.1 | |
| 20 | M | 7 | 143 | 10.8 | 1.68 | 0.86 | 206.2 | 204.8 | |
| 21 | N | 7 | 163 | 13.4 | 1.77 | 0.87 | 208.3 | 208.1 | Comparative Example |

†$E \geq 205 - 3.3 \times Si + 10 \ldots$ (i)

As shown in Tables 1 to 4, the non-oriented electrical steel sheets of the examples of the present invention have an excellent workability and excellent magnetic characteristics after strain relief annealing. Furthermore, since a Goss orientation is dominant in the stator pieces in the segmented stators of the examples of the present invention, the results in which a small iron loss, a high magnetic flux density, and a higher Young's modulus are provided were obtained as compared with the comparative examples.

INDUSTRIAL APPLICABILITY

As described above, according to the present invention, it is possible to obtain a non-oriented electrical steel sheet which has an excellent workability and excellent magnetic characteristics after strain, relief annealing, a segmented stator which has excellent magnetic characteristics, in which deformation due to compressive stress in a circumferential direction is minimized, and which has a high dimensional accuracy, and a rotating electrical machine which has the segmented stator.

REFERENCE SIGNS LIST

10 Segmented stator
10a Stator piece
11 Yoke
12 Teeth
12a Groove bottom
20 Rotor
30 Case
100 Rotating electrical machine

The invention claimed is:

1. A non-oriented electrical steel sheet, comprising:
a chemical composition containing, in terms of % by mass, C: 0.0015% or less; and
Si: 2.5 to 4.0%,
wherein an average crystal grain size is 10 to 40 μm, and an internal oxidation layer having a thickness of 0.5 to 3.0 μm from a surface in a sheet thickness direction is present.

2. The non-oriented electrical steel sheet according to claim 1, wherein the chemical composition contains, in terms of % by mass,
C: 0.0015% or less;
Si: 2.5 to 4.0%;
Mn: 0.05 to 2.0%;
sol. Al: 0.0005 to 1.50%;
P: 0.080% or less;
S: 0.0030% or less;
Ti: 0.0030% or less;
Ni: 0 to 0.10%;
Cu: 0 to 0.10%;
Cr: 0 to 0.10%;
Sn: 0 to 0.20%;
Ca: 0 to 0.0050%;
Mg: 0 to 0.0050%;
REM: 0 to 0.0050%; and
the balance: Fe and impurities.

3. The non-oriented electrical steel sheet according to claim 1, wherein $E_L/E_c$ which is a ratio between a Young's modulus $E_L$ in a rolling direction and a Young's modulus $E_c$ in a direction perpendicular to the rolling direction is 0.90 or more.

4. The non-oriented electrical steel sheet according to claim 1, wherein a tensile strength is (230+100×([Si]+0.5×[sol. Al])) MPa or more and an elongation is less than 20%, where [Si] is a Si content in terms of % by mass in the non-oriented electrical steel sheet and [sol. Al] is a sol. Al content in terms of % by mass in the non-oriented electrical steel sheet.

5. A segmented stator for a rotating electrical machine segmented into a plurality of stator pieces in a circumferential direction, comprising:
a cylindrical yoke extending in an axial direction; and
a plurality of teeth extending in a radial direction from an inner circumferential surface of the yoke,
wherein each of the stator pieces is formed by laminating a plurality of non-oriented electrical steel sheets according to claim 1,
when directions in which the teeth extend are defined as a reference of a crystal axis, an X-ray random intensity ratio of a {110} <001> orientation of the stator piece is 5 or more, an average crystal grain size of the non-oriented electrical steel sheet is 100 to 200 μm, and a chemical composition of the non-oriented electrical steel sheet contains, in terms of % by mass, C: 0.0015% or less; and Si: 2.5 to 4.0%.

6. The segmented stator according to claim 5, wherein a value of B50/Bs in directions in which the teeth of the stator piece extend is 0.85 or more, and a Young's modulus E (GPa) of the yoke in a circumferential direction satisfies the following Expression (i);

$$E \geq 205 - 3.3 \times [Si] + 10 \quad (i),$$

where [Si] in the foregoing Expression represents a Si content in terms of % by mass in the non-oriented electrical steel sheet.

7. The segmented stator according to claim 5, wherein the chemical composition of the non-oriented electrical steel sheet contains, in terms of % by mass, C: 0.0015% or less;
Si: 2.5 to 4.0%;
Mn: 0.05 to 2.0%;
sol. Al: 0.0005 to 1.50%;
P: 0.080% or less;
S: 0.0030% or less;
Ti: 0.0030% or less;
Ni: 0 to 0.10%;
Cu: 0 to 0.10%;
Cr: 0 to 0.10%;
Sn: 0 to 0.20%;
Ca: 0 to 0.0050%;
Mg: 0 to 0.0050%;
REM: 0 to 0.0050%; and
the balance: Fe and impurities.

8. A rotating electrical machine, comprising:
the segmented stator according to claim 5;
a rotor disposed on an inner circumference side of the segmented stator; and
a case which is in close contact with the plurality of stator pieces from an outer circumference of the yoke and fixes the stator pieces.

* * * * *